(No Model.) 2 Sheets—Sheet 1.
A. J. SMITH.
HANDLE BAR FOR CYCLES.
No. 557,035. Patented Mar. 24, 1896.
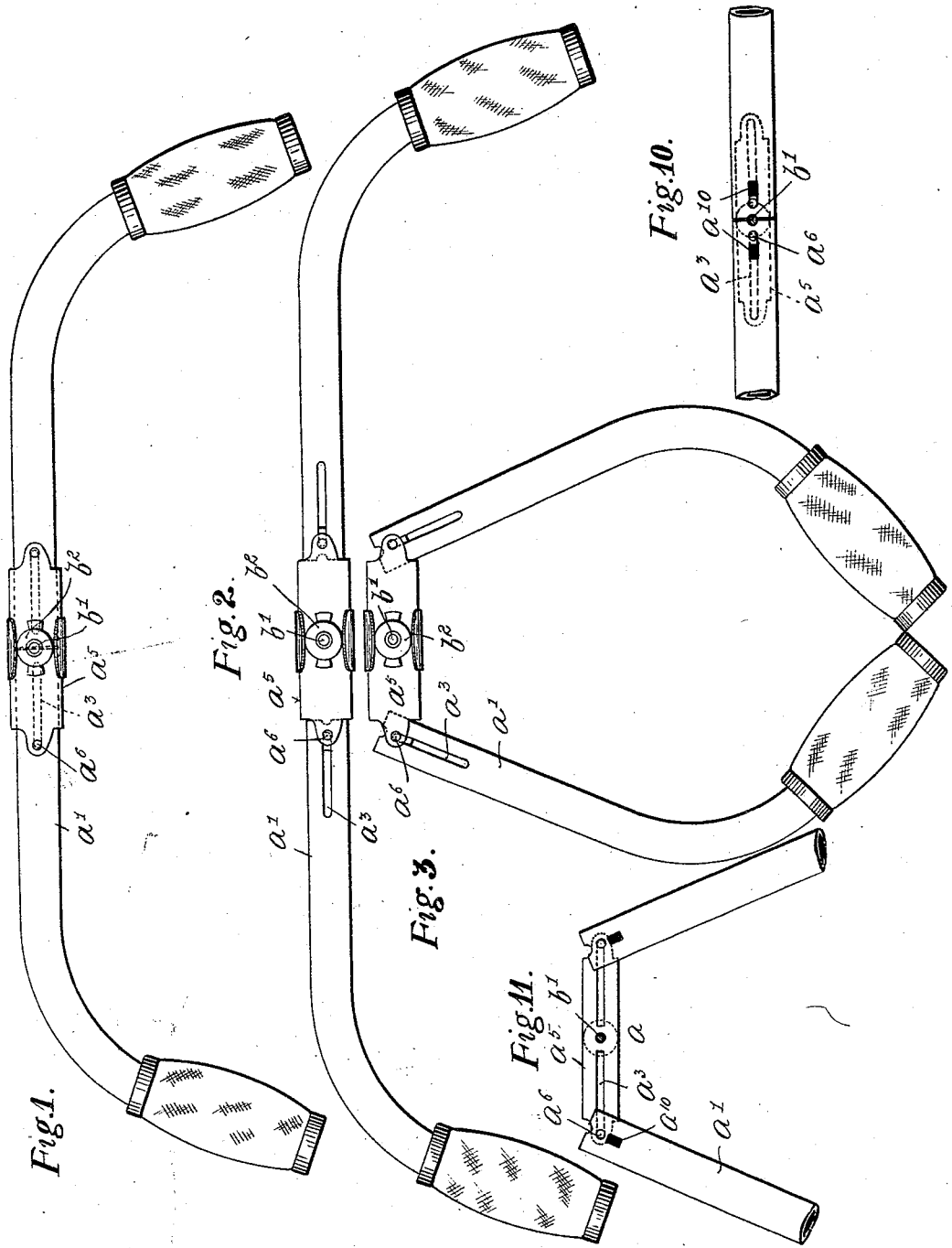
WITNESSES.
Henry S Kerrett
Arthur T Sadler
INVENTOR.
Arthur Johnson Smith (No Model.) 2 Sheets—Sheet 2.
A. J. SMITH.
HANDLE BAR FOR CYCLES.
No. 557,035. Patented Mar. 24, 1896.
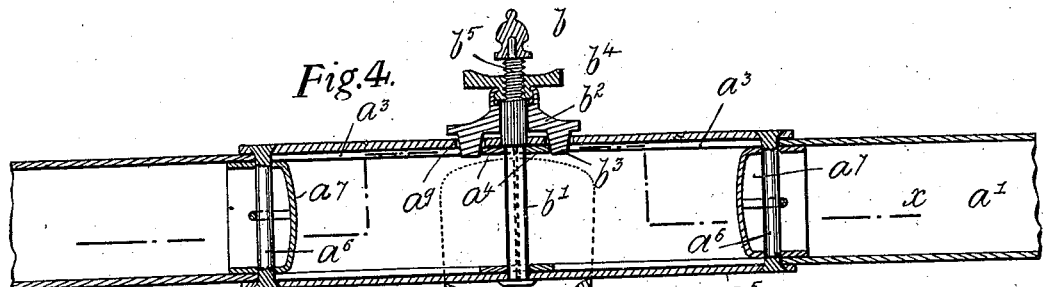
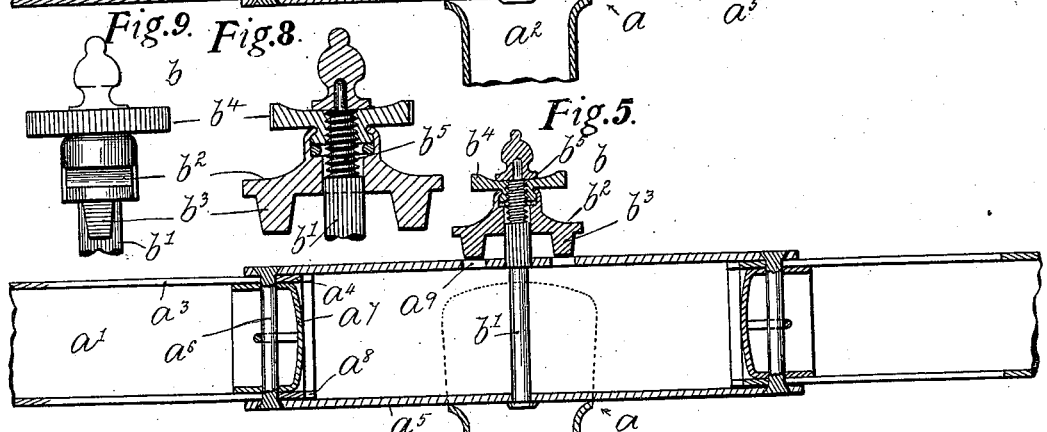
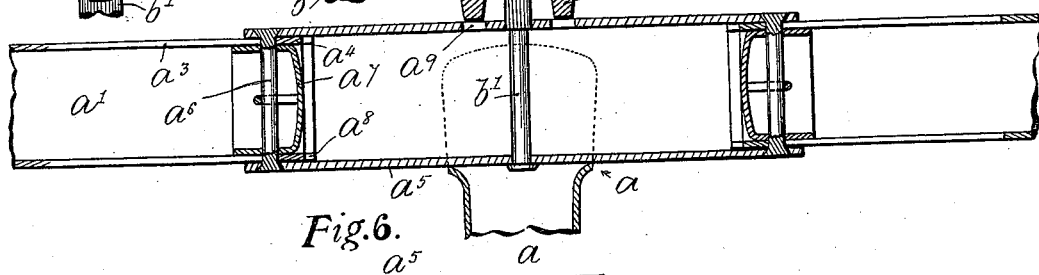
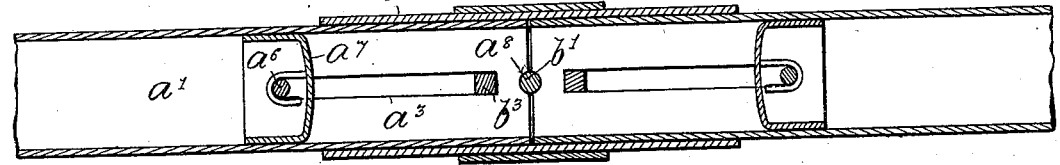
WITNESSES. INVENTOR
Henry Skerrett
Arthur J. Sadler
Arthur Johnson Smith

UNITED STATES PATENT OFFICE.

ARTHUR JOHNSON SMITH, OF BIRMINGHAM, ENGLAND.

HANDLE-BAR FOR CYCLES.

SPECIFICATION forming part of Letters Patent No. 557,035, dated March 24, 1896.

Application filed November 4, 1895. Serial No. 567,941. (No model.) Patented in England September 27, 1895, No. 18,050.

*To all whom it may concern:*

Be it known that I, ARTHUR JOHNSON SMITH, manufacturer, a subject of the Queen of Great Britain, residing at Variety Works, Frederick Street, in the city of Birmingham, England, have invented new and useful Improvements in Handle-Bars for Cycles, of which the following is a specification, and for which invention I have obtained Letters Patent of Great Britain, dated the 27th day of September, 1895, and numbered 18,050.

This invention has relation to the handle-bars of cycles, and has for its object to provide a new and improved construction whereby the handle-bar is rendered collapsible or folding in order to allow of a machine resting against an upright support when not in use, being compactly packed for transit or storage, and also passing through narrow doorways or openings.

In carrying out my invention I make the sides or halves of the handle-bar from two tubular sections, longitudinally slotted at their inner ends, and made to work and socket telescopically within a hollow sleeve or T end surmounting the steering-post or handle-bar support, the middle part of which sleeve or T end is provided with a spring-catch, screw or plain bolt for engaging with the inner parts of the slots in the handle-bar ends on the same being taken into their slid-in and normal positions. The said sleeve ends may have lips or brackets through which the inner terminations of the handle-bar ends, pins or pivots, constituting the axes upon which the said ends turn for folding, pass.

Assuming that the ends of the handle-bar are in their normal positions, and are there locked by the automatic or other catch, then to release the same first lift the bolt or raise the catch and longitudinally withdraw the handle ends from the sleeve and when clear of the ends of the said sleeve turn or fold the same down or inward, and so materially reduce the normal span or breadth of the handle-bar.

I wish it to be understood that the pivoting may be in any direction, but I prefer it to be either horizontal or vertical.

Figure 1 of the accompanying drawings represents in top side plan a handle-bar made folding according to one form of my improvements. The ends of the handle-bar halves are shown in their normal positions and locked, as when in use. Fig. 2 represents a like view as Fig. 1, but with the end parts of the handle-bar sections withdrawn from the sleeve or socket, and Fig. 3 represents the same folded. Fig. 4 represents an enlarged sectional view of the middle part of the handle-bar Fig. 1. Fig. 5 is a like sectional view as Fig. 4, but with the ends telescopically drawn out. Fig. 6 is a horizontal section upon the dotted lines $x\,x$, Fig. 4. Fig. 7 represents a top side plan, with the catch removed, of the handle-bar with the sections or arms folded upon their pivots. Fig. 8 is a vertical section of the catch or locking means, and Fig. 9 is a side elevation of the same.

The same letters of reference indicate corresponding parts in the several figures of the drawings.

$a'$ are tubular sections or arms, socketing into and telescopically sliding within a tubular middle member or cross-head $a$, carried at the summit of the steering-post $a^2$, of a bicycle. The said sections or arms $a'$ have longitudinal clearance-slots $a^3$ extending to near their inner ends, leaving solid parts $a^4$ which form shoulders or abutments for preventing the same from being entirely withdrawn from the socket branches $a^5$ of the tubular cross-head $a$.

$a^6$ are pins or rivets carried at the ends of the branches of the sockets $a^5$ and taking through the clearance-slots $a^3$, about which pins or rivets the ends of the arms of the bar turn as centers for folding, and which constitute stops for limiting the withdrawal of the sections or arms from the sockets. The open inner ends of these arms have closures $a^7$ and semicircular gaps $a^8$, which latter are for the purpose to allow of the ends on coming together missing the central pin $b'$ of the lock $b$, which consists of an adjustable stud-plate $b^2$, having inclined studs $b^3$ upon its under side taking through holes $a^9$ in the tubular middle member $a$ and entering the inner ends of the slots $a^3$, thereby preventing the arms $a'$ from being withdrawn and rigidly affixing the same without rattling.

The adjustable stud-plate is pushed home and withdrawn by a propelling and repelling nut $b^4$, taking upon the screwed end $b^5$ of the central pin $b'$.

Assuming that a machine requires to be set up against a wall, or packed for transit, or to be passed through a narrow opening, unscrew the milled nut $b^4$, when the stud-plate is lifted, taking its studs clear of the slots $a^3$ in the handle-bar arms, which are then bodily and longitudinally pulled out of the socket up to the stop-pins, upon which they are then folded inward.

To affix the handle-bar arms into position for use, turn the folded arms alinable with the tubular middle member and then run the same inward into the sockets until the ends nearly abut against one another. Then rotate the locking-screw, when the conical studs are forced home and the loose component parts are rigidly fixed and locked in position.

Fig. 10 represents a modified form of my improvements, in which the handle-bar end is made to telescopically slide and socket over the cross-head instead of socketing within the same.

Fig. 11 represents the handle-bar folded.

$a'$ are the arms carrying pivots $a^6$ at their inner ends working within slots $a^3$, formed in the ends $a^5$ of the cross-head $a$, which is carried by the steering-post or handle-bar support, and over which the hollow ends of the said arms $a'$ socket and slide. The said arms are provided with holes $a^{10}$ through which the studs of the locking device screwing on the pin $b'$ pass and take into the slots $a^3$.

Having fully described my invention, what I desire to claim and secure by Letters Patent is—

1. In a handle-bar for cycles the combination with a cross-head, of two handle-bar sections having a pivoted and slotted connection with and slidable along said cross-head, and a locking device mounted and movable on the cross-head and having means for engaging the inner ends of the handle-bar sections when they are slid inward, substantially as described.

2. The combination in a handle-bar for a cycle, of a cross-head, two handle-bar sections pivotally connected with and slidable longitudinally along the cross-head, a pin secured to and extending from the cross-head, and a stud-plate mounted on said pin and having studs which engage the inner ends of the handle-bar sections when they are slid inward, substantially as described.

3. The combination in a handle-bar for a cycle, of a tubular cross-head having end cross-pins, two handle-bar sections provided with longitudinally-slotted portions through which the said cross-pins respectively extend, and a locking device carried by the said cross-head and having studs which enter the longitudinally-slotted portions of the handle-bar sections when they are slid inward, substantially as described.

4. The combination in a handle-bar for a cycle, of a tubular cross-head, two handle-bar sections pivotally connected with the cross-head and constructed with longitudinal slots, a pin secured to and extending from the cross-head, and a stud-plate mounted on the pin and provided with studs which enter the longitudinal slots of the handle-bar sections when the latter are slid inward, substantially as described.

5. The combination in a handle-bar for a cycle, of a tubular cross-head having end cross-pins, two handle-bar sections having longitudinal slots in their inner end portions through which said cross-pins extend, and a stud-plate having a screw-threaded connection with a cross-head and provided with studs which enter the longitudinal slots of the handle-bar sections when the latter are slid inward, substantially as described.

In testimony whereof I have hereunto set my hand in presence of two subscribing witnesses.

ARTHUR JOHNSON SMITH.

Witnesses:
HENRY SKERRETT,
ARTHUR T. SADLER.